United States Patent
Jacob

(10) Patent No.: US 7,312,917 B2
(45) Date of Patent: Dec. 25, 2007

(54) VARIABLE FOCAL LENGTH ELECTRO-OPTIC LENS

(75) Inventor: Steve A. Jacob, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 11/234,347

(22) Filed: Sep. 23, 2005

(65) Prior Publication Data

US 2007/0070491 A1    Mar. 29, 2007

(51) Int. Cl.
*G02F 1/29*    (2006.01)
*G02F 1/03*    (2006.01)

(52) U.S. Cl. ..................... 359/319; 359/246

(58) Field of Classification Search ............... 359/319
See application file for complete search history.

(56) References Cited

U.S. PATENT DOCUMENTS

| | | | |
|---|---|---|---|
| 4,466,703 A | 8/1984 | Nishimoto | |
| 4,525,687 A | 6/1985 | Chemla et al. | |
| 4,572,616 A | 2/1986 | Kowel et al. | |
| 5,126,875 A | 6/1992 | Tabuchi | |
| 5,212,583 A | 5/1993 | Vali et al. | |
| 5,795,699 A | 8/1998 | Zhou et al. | |
| 6,545,816 B1 | 4/2003 | Kroupenkine et al. | |
| 6,577,434 B2 | 6/2003 | Hamada | |
| 6,619,799 B1 | 9/2003 | Blum et al. | |
| 6,665,127 B2 | 12/2003 | Bao et al. | |
| 6,674,940 B2 | 1/2004 | Kroupenkine | |
| 6,859,333 B1 | 2/2005 | Ren et al. | |
| 2001/0055145 A1* | 12/2001 | Hamada | 359/290 |
| 2004/0108984 A1 | 6/2004 | Ogasawara | |
| 2004/0114203 A1 | 6/2004 | Batchko | |
| 2005/0073739 A1 | 4/2005 | Meredith et al. | |

FOREIGN PATENT DOCUMENTS

GB    2171811 A    9/1986

OTHER PUBLICATIONS

Sato, et al., "Electro-optic Variable Focal-length Lens Using PLZT Ceramic"; Applied Optics, Dec. 1, 1991, vol. 30, No. 34, pp. 5049-5055.
Hwang, et al., "Optical Properties of Calcium-Aluminate Oxide Glasses"; Chinese Journal of Physics; Feb. 1997, vol. 35; No. 1, pp. 78-89.
International Search Report for Application No. PCT/US2006/029084. Report issued Nov. 27, 2006.

* cited by examiner

*Primary Examiner*—Jordan Schwartz
*Assistant Examiner*—James C Jones

(57) ABSTRACT

A variable focal length lens includes a plurality of layers of an electro-optic material and alternating stacked substantially transparent conductor layers and substantially transparent resistor layers. Each layer of electro-optic material is sandwiched between a separate conductor layer and a separate resistor layer. The focal length of the lens is varied by varying the voltage applied to the resistor layers.

22 Claims, 6 Drawing Sheets

US 7,312,917 B2

VARIABLE FOCAL LENGTH ELECTRO-OPTIC LENS

FIELD OF THE INVENTION

The present invention relates to a variable focal length lens, and more particularly to a variable focal length lens whose focal length can be varied by utilization of an electro-optic effect.

BACKGROUND

A variable focal length lens can include a gradient index (GRIN) lens, whose focal length can be controlled electrostatically, or a flexible polymeric lens whose focal length can be controlled mechanically. Both technologies have inherent limitations that impose restrictions on the performance of these existing tunable lenses.

Gradient index lenses have inherent limitations associated with the relatively small electro-optic coefficients found in the majority of electro-optic materials. This results in a small optical path modulation and, therefore, requires thick lenses or very high voltages to be employed. In addition, many electro-optic materials show a strong birefringence that causes polarization dependence of the lens properties.

Mechanically adjustable flexible lenses typically have a substantially wider range of tunability than GRIN lenses. However, they require external actuation devices, such as micropumps, to operate. Integration of such devices involves substantial problems, especially severe in the case where a two-dimensional array of tunable lenses is required.

SUMMARY OF THE INVENTION

A variable focal length lens includes a plurality of layers of an electro-optic material and alternating stacked substantially transparent conductor layers and substantially transparent resistor layers. Each layer of electro-optic material can be sandwiched between a separate conductor layer and a separate resistor layer. The focal length of the lens can be varied by varying the voltage applied to the resistor layers.

The variable focal length lens can be formed by providing a substrate. A film of substantially transparent conductive material can be provided on the substrate. A film of electro-optic material can be provided on the film of conductive material. A film of substantially transparent dielectric material can be provided on the film of electro-optic material. A resistor can be formed in the dielectric material. The resistor upon application of a bias voltage is capable of applying to the film electro-optic material a substantially parabolic electric field having an intensity distribution that varies in a plane normal to the direction of light incidence.

BRIEF DESCRIPTION OF DRAWINGS

The foregoing and other embodiments will become apparent to those skilled in the art upon reading the following description with reference to the accompanying drawings.

DETAILED DESCRIPTION

Figure 1:
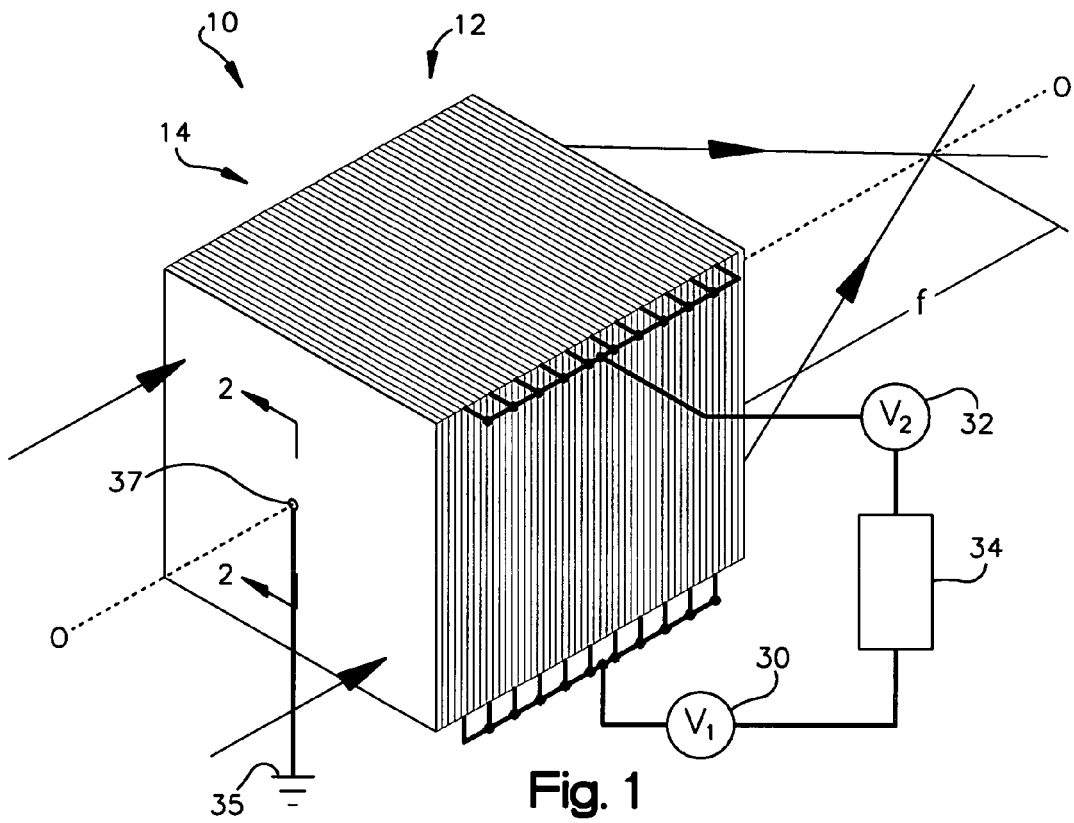
FIG. 1 illustrates a schematic perspective view of one embodiment of an optical device.

FIG. 1 illustrates a schematic perspective view of an exemplary optical device 10. The optical device 10 illustrated in this view includes a variable focal length lens 12 whose focal length (f) can be varied (e.g., from infinity to $-3.5 \times 10^{-4}$ mm) by utilization of an electro-optic effect without any mechanical movement. The focal length f of the variable focal length lens 12 can be varied by varying the bias voltage (e.g., 0 V to about 5 V) applied to the variable focal length lens 12.

The variable focal length lens 12 of the optical device 10 can change its focal length in about 30 microseconds allowing its use in applications requiring high-speed corrections. Examples of such applications can include an endoscope lens, an eyeglass lens, a microscope focusing and/or zoom lens, a camera focusing and/or zoom lens, a rifle sight lens, and/or a binocular lens. It will be appreciated that the variable focal length lens 12 of the optical device 10 can be used for other applications, such as an optical lens system for optical data storage systems, optical phase arrays, laser or other optical projectors, scanning devices, as well as other devices that employ variable focal length lens.

Figure 2:
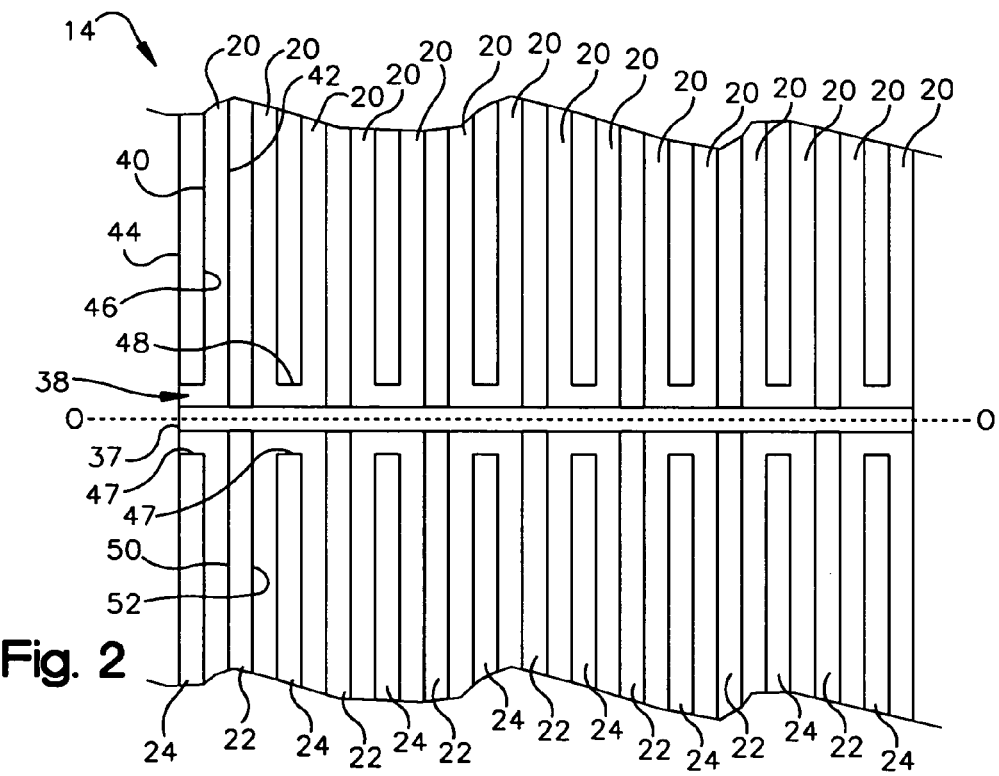
FIG. 2 illustrates a schematic cross-sectional view of a portion of a variable focal length lens of the optical device of FIG. 1.

Referring also to FIG. 2, the variable focal length lens 12 includes an optical stack that comprises a plurality of substantially transparent electro-optic layers 20, substantially transparent resistor layers 22, and substantially transparent conductor layers 24. The electro-optic layers 20, resistor layers 22, and conductor layers 24 are each substantially planar and extend substantially normal to an optical axis O. The electro-optic layers 20 are alternatively stacked with the resistor layers 22 and conductor layers 24 so that each electro-optic layer 20 is substantially parallel to and sandwiched between a separate resistor layer 22 and a separate conductor layer 24.

Referring again to FIG. 1, the substantially transparent resistor layers 22 are electrically coupled in parallel to a first power source 30, and the substantially transparent conductor layers 24 are electrically coupled in parallel to a second power source 32. The first power source 30 and the second power source 32 can each comprise a variable voltage source (30 and 32) that is capable of applying various bias voltages to, respectively, the resistor layers 22 and conductor layers 24. The bias voltage applied by the power source 30 and the power source 32 can apply a low voltage, such as up to about 5V. A low voltage allows the variable focal length lens 12 to be used in in vivo applications, e.g., endoscope.

The first power source 30 and the second power source 32 are coupled to a voltage control means 34. The voltage control means 34 can comprise, for example, a circuit that is capable of controlling the voltage applied by the first power source 30 and the second power source 32 to, respectively, the resistor layers 22 and the conductor layers 24.

The substantially transparent resistor layers 22 are electrically coupled to a ground 35 through a conductive via 37.

The conductive via 37 comprises a substantially transparent conductor material that extends coincident to the optical axis O and through each of the layers 20, 22, 24 of the optical stack 14 of the variable focal length lens 12.

The conductive via 37 is electrically isolated (i.e., insulated) from the conductive layers 24 by a plurality of substantially annular electrical isolation regions 38. The substantially annular isolation regions can comprise essentially the same electro-optic material used to form the electro-optic layers 20. The isolation regions 38 are axially aligned about the conductive via 37 so that the conductor layers 24 are separated from the conductive via 37 by the regions 38. The substantially annular isolation regions 38 include annular portions with substantially uniform radial widths that extend substantially perpendicular to the optical axis. The radial width of each annular isolation region 38 can be substantially the same as the optical path thickness of each electro-optic layer 22 so that an electric field generated upon application of bias voltage to the variable focal lens 12 does not exceed the insulation or isolation limits of the isolation regions 38. For example, the isolation regions 38 can have radial widths of about 50 nm to about 500 nm.

The electro-optic layers 20, resistor layers 22, and conductor layers 24 can have a substantially uniform refractive index across each layer when no bias voltage is applied from the first variable voltage source 30 to the resistor layers 22. Upon application of a bias voltage to the resistor layers 22 from the first variable voltage source 30, the resistor layers 22 are capable of applying to each electro-optic layer 20 a radial parabolic electric field having an intensity distribution that varies within a plane substantially normal to the optical axis O. The radial parabolic electric field produces a radial symmetric parabolic index of refraction gradient in each of the electro-optic layers 20. This refractive index distribution can provide the variable focal length lens 12 with a first focal length f when a first bias voltage is applied by the first voltage source 30 and second focal length f when a second bias voltage is applied by the first voltage source 30. For example, the variable focal length lens 12 can have a focal length of infinity when a bias of 0 V is applied and a focal length of about 350 mm when a bias of about 5V is applied.

The second voltage source 32 electrically coupled to the conductor layers 24 can act as a binary switch that changes the lens behavior from a converging lens to a diverging lens when a bias voltage (e.g., about 5V) is applied to the conductor layers 24. Application of a bias voltage (e.g., about 5 V) from the second voltage source 32 to the conductor layers 24 can change the electric field intensity distribution in the electro-optic layers 20 from a maximum electric field strength at a center of the electro-optic layers 20 coincident with the optical axis O to a minimum electric field strength. This in turn results in a change in refractive index distribution and a change in focal length of the variable focal length lens 12. The bias voltage applied by first voltage source 30 to the resistor layers 22 can then be changed while maintaining the bias voltage applied to conductor layers 24 constant to change the focal length of the variable focal length lens 12 from a third focal length to a fourth focal length. For example, the variable focal length lens 12 can have a focal length of about −3750 mm when a bias of 0.5 V is applied by first voltage source 30 and a bias of about 5 V is applied by the second voltage source 32, and a focal length of about −400 mm when a bias of about 5 V is applied by the first voltage source 30 and a bias of about 5V is applied by the second voltage source 32.

Referring again to FIG. 2, the electro-optic layers 20 can each have a substantially planar first surface 40 and an opposite substantially parallel second surface 42. The first surface 40 and the second surface 42 of each electro-optic layer 20 can extend substantially normal to the optical axis O of the variable focal length lens 12. Each electro-optic layer 20 can have a substantially uniform thickness. The thickness of each electro-optic layer 20 can be about half the wavelength of the light passing through the variable focal length lens 12. For light in the visible spectrum, the thickness of each electro-optic layer 20 can be about 200 nm to about 350 nm. It will be appreciated that the thickness of each electro-optic layer 20 can be less than about 200 nm (e.g., about 50 nm or less) or greater than about 400 nm (e.g., about 500 nm or more) depending on the desired optical properties of the lens 12. It will also be appreciated that the thickness of individual electro-optic layers 20 can vary from layer to layer.

The electro-optic layers 20 can be formed from a substantially transparent electro-optic material whose refractive index is varied when an electric field is applied to the material. The electro-optic material can exhibit a Pockels effect such that the refractive index variation is proportional to the intensity of the applied electric field or a Kerr effect (i.e., quadratic electro-optic effect) such that the refractive index variation is proportional to the square of the applied electric field.

The electro-optic material can be, for example, a solid state material or a liquid crystalline material. Exemplary solid state materials that can be used as the electro-optic material include barium titanate ($BaTiO_3$), lanthanum-modified lead zirconate titanate (PLZT), lithium niobate ($LiNbO_3$), lithium titanate ($LiTaO_3$), dibasic potassium phosphate ($KH_2PO4$) (KDP), zinc oxide (ZnO), and combinations thereof. Exemplary liquid crystalline materials can be nematic, smectic, or cholesteric liquid crystalline materials. For example, nematic phase crystals can include 4-pentyl-4'-cyanobiphenyl (5CB) and 4-(n-octyloxy)-4'-cyanobiphenyl (8OCB). Other exemplary liquid crystals include the various compounds of 4-cyano-4'-(n-alkyl)biphenyls, 4-(n-alkoxy)-4'-cyanobiphenyl, 4-cyano-4''-(n-alkyl)-p-terphenyls, and commercial mixtures, such as E7, E36, E46, and the ZLI-series made by BDH (British Drug House)-Merck.

It will be appreciated that the electro-optic material can include other electro-optic materials, such as a thermoplastic or thermosetting polymer that is blended or co-polymerized with an electro-optic chromophore. The thermoplastic or thermosetting polymer can be selected from the group consisting of acrylics/methacrylics, polyesters, polyurethanes, polyimides, polyamides, polyphosphazenes, epoxy resins, and hybrid (organic-inorganic) or nanocomposite polyester polymers. Combinations of thermoplastic and thermosetting polymers (interpenetrating polymer networks) are also contemplated. The polymers can be combined with electro-optic chromophores, either as part of the backbone chain or blended and can contain compatibilization additives or groups and/or adhesion-promotion additives or groups. The electro-optic chromophore can be, for example, a substituted aniline, substituted azobenzene, substituted stilbene, or substituted imine.

The substantially transparent conductor layers 24, which together with the resistor layers 22 sandwich separate electro-optic layers 20, can each have a substantially planar first surface 44 and an opposite substantially parallel second surface 46. The first surface 44 and the second surface 46 can extend substantially normal to the optical axis O of the variable focal length lens 12 between and inner surface 47 and an outer surface (not shown). At least one surface (44 or 46) of each conductor layer 24 abuts a surface (40 or 42) of a separate electro-optic layer so that one surface (40 or 42) of each electro-optic layer 20 is substantially covered with a conductor layer 24 and a separate conductor layer 24 is sandwiched between separate electro-optic layers 20, except where the conductor layer 24 defines an outer surface of the variable focal length lens 12. The inner surface 47 of each conductor layer 24 abuts an outer surface 48 of the isolation regions 38.

The conductor layers 24 can have a substantially uniform thickness that can range, for example, from about 25 nm to about 500 nm. It will be appreciated that the thickness can be lesser than about 25 nm or greater than about 500 nm. The conductor layers 24 can be formed from any substantially transparent and electrically conductive material. For example, the conductive material can comprise indium tin oxide (ITO), indium oxide, tin oxide, or other electrically conductive and optically transparent materials.

The substantially transparent resistor layers 22 can each have a substantially planar first surface 50 and an opposite substantially parallel second surface 52 that extends normal to the optical axis O of the variable focal length lens 12. The resistor layers 22 can substantially cover the surfaces (40 or 42) of the electro-optic layers opposite the surfaces (40 or 42) on which the substantially transparent conductor layers 24 are provided.

The substantially transparent resistor layer 22 can have a substantially uniform thickness that can range, for example, from about 25 nm to about 500 nm. It will be appreciated that the thickness can be lesser than about 25 nm or greater than about 500 nm.

Figure 3:
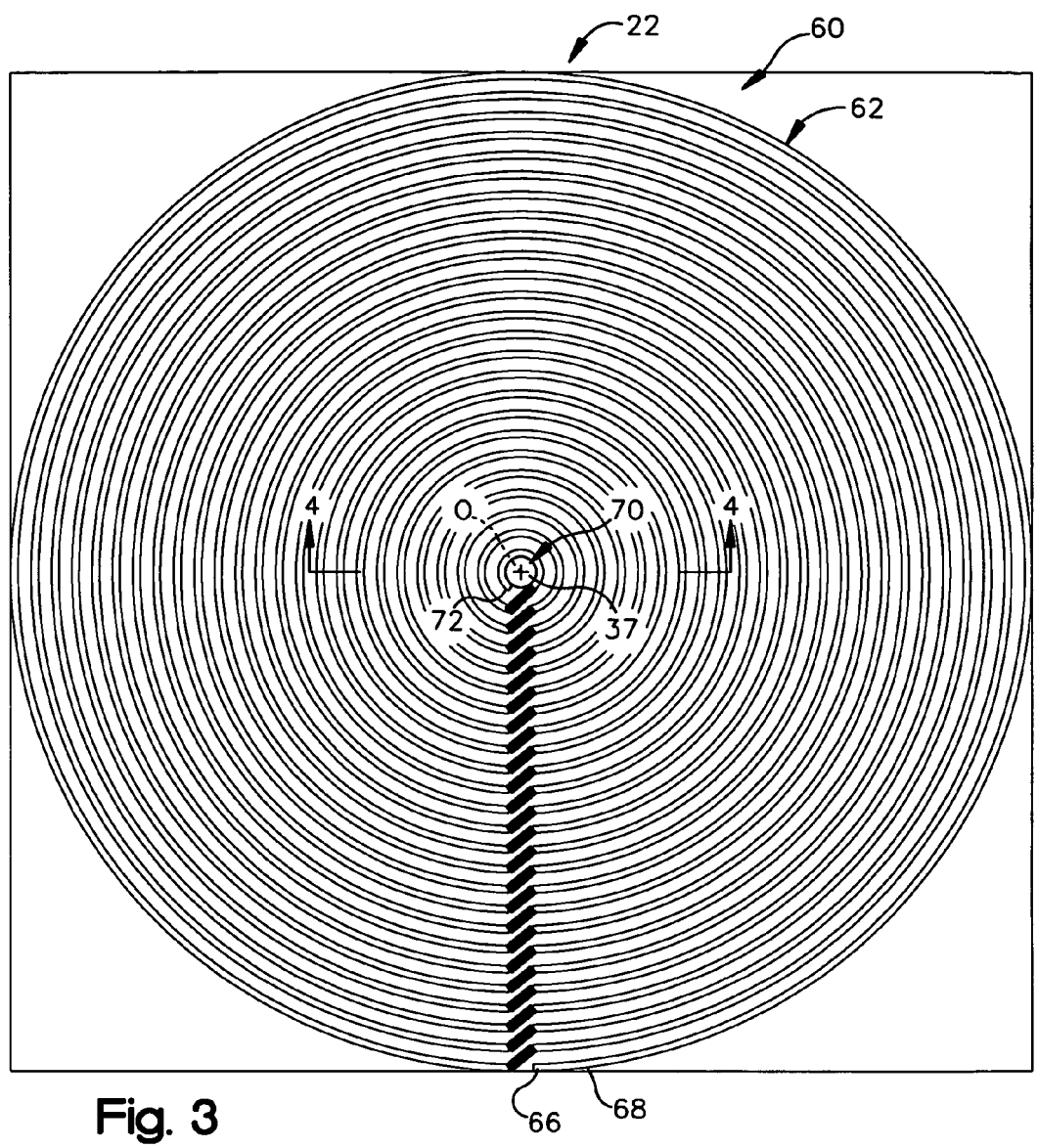
FIG. 3 illustrates a schematic top-plan view of a portion of the variable focal length lens.
Figure 4:
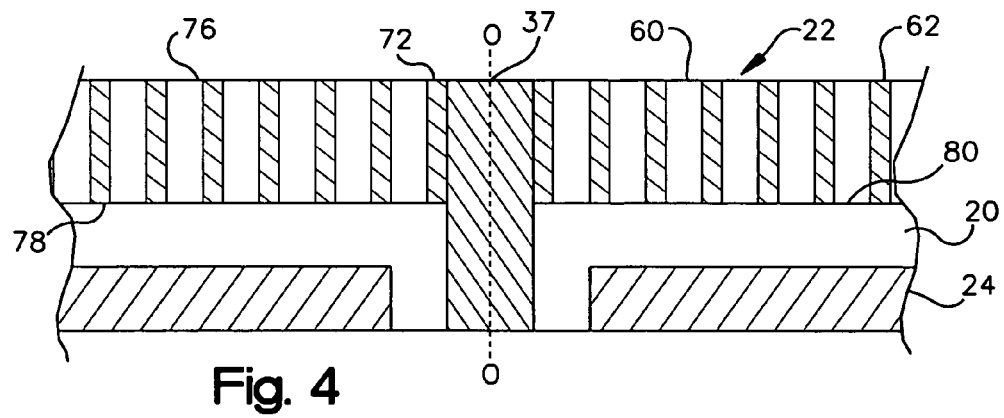
FIG. 4 illustrates a schematic cross-sectional view of a portion of the variable focal lens of FIG. 3 along lines 4-4.

Each resistor layer 22 includes a substantially transparent resistor that is capable of applying a parabolic electric field to an electro-optic layer. FIG. 3 is a top plan view of an exemplary resistor layer 22 that is capable of generating a parabolic electric field. The resistor layer 22 includes a substantially uniform layer 60 of dielectric material and a spiral resistor 62. The spiral resistor 62 can comprise a coil of resistive material that curves concentrically from a first end 66 at an edge 68 of the resistor layer 22 about a point 70 on resistor layer 22 coincident with the optical axis O getting progressively closer to it so that a second end 72 of the resistor contacts the ground via 37. FIG. 4, which is a cross-sectional view of FIG. 3 along lines 4-4, shows that the spiral resistor 62 can extend from a first surface 76 of the resistor layer 22, through the dielectric material 60, to a second surface 78 of the resistor layer 22, which is in contact with a surface 80 of the electro-optic layer 20.

The spiral resistor 62 can be formed from any substantially transparent resistive material, such as a semiconductor. In accordance with one example, the spiral resistor 62 can be formed by providing a layer of dielectric material, such as calcium aluminate oxide glass ($12CaO.7Al_2O_3$), over an electro-optic layer 22. The dielectric material can be deposited using thin film deposition techniques, such as Langmuir-Blodgett thin film deposition, chemical vapor deposition (CVD), and spin-on-dielectric (SOD)). The deposited layer of dielectric material can then be doped with hydrogen ions by, for example, annealing the deposited layer in a hydrogen atmosphere. Doping the layer of dielectric material makes the material photosensitive to UV radiation. A mask with a spiral opening defining the area of the spiral resistor 62 can be provided over the layer of dielectric material. A UV light source can then be used to expose portions of the dielectric material not covered by the mask. UV light turns the exposed spiral portion of the dielectric material into a spiral low conductor or resistor that has conductivity, for example, of less than about $10^{-10}$ S cm$^{-1}$ to about 03 S cm$^{-1}$ (or resistivity of about $10^{10}$ ohms cm$^{-1}$ to about 3.33 ohms cm$^{-1}$).

It will be appreciated that the spiral resistor 62 can be formed using other techniques. For example, a layer of dielectric material can be deposited on the electro-optic layer and subsequently etched with etchant gas(es), (e.g., carbon tetrafluoride ($CF_4$)) containing fluorine ions or trifluoromethane ($CHF_3$) and argon) in an etcher, such as a parallel plate reactive ion etching (RIE) apparatus, to form a spiral opening. The spiral opening can be filled with a substantially transparent low conductive or resistive material using deposition techniques and then planarized to remove excess deposited resistive material.

Figure 5:
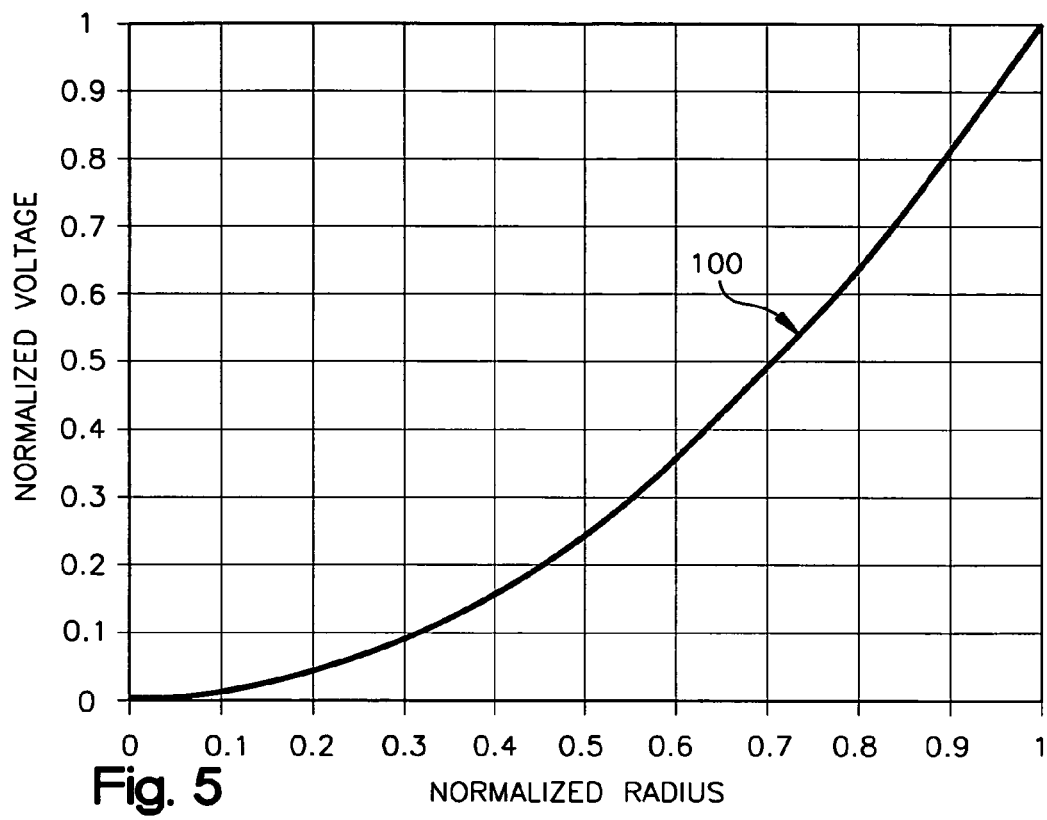
FIG. 5 illustrates a plot of the normalized voltage as a function of the normalized radius for a spiral resistor of the variable focal length lens.

When the spiral transparent resistor 62 is electrically coupled to the first variable voltage source 30, application of a bias voltage to the spiral resistor 62 results in a uniform voltage drop across along the length of the spiral resistor 62. This uniform voltage drop is illustrated in FIG. 5, which is a plot of the normalized voltage as a function of the normalized radius for a spiral resistor. The plot 100 indicates that at the periphery or rim of the spiral resistor the normalized voltage is about 1. The normalized voltage is zero at the center of the spiral resistor 62 and increases to unity at the periphery, closely approximating a parabolic curve (i.e., reference parabola).

The generally parabolic drop in voltage across the spiral resistor results in the formation of a radial substantially parabolic electric field that decreases increases from the center to the periphery of the spiral resistor 62. The substantially parabolic electric field is also centered about and extends substantially normal to the optical axis O. It will be appreciated that that the distance between coils and the number of coils of the spiral resistor 62 can be selected so as to optimize the formation of a substantially parabolic electric field by the spiral resistor 62.

The radial substantially parabolic electric field produces a radial symmetric parabolic index of refraction gradient in the electro-optic layer, which can be varied by variation of the bias voltage applied to the spiral resistor 62. The refractive index distribution produced by the electric field applied by the spiral resistor 62 provides an electro-optic layer with a converging lens action and a focal length can be changed readily and continuously by varying the bias voltage from the variable voltage source 30.

Figure 6:
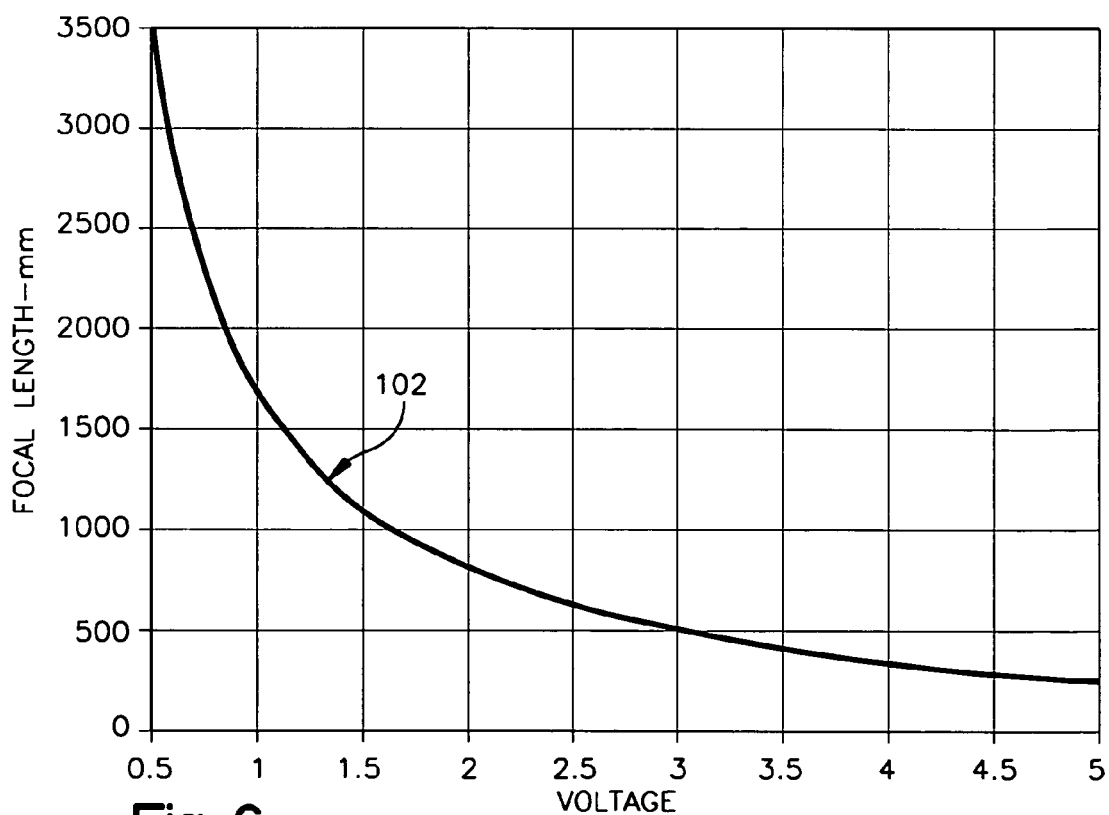
FIG. 6 illustrates a plot of the focal length in mm as a function voltage for a variable focal length lens.

For example, FIG. 6 is a plot 102 that illustrates the focal length in mm as a function voltage for a variable focal length lens. The variable focal length lens can include a plurality of barium titanate electro-optic layers alternatively stacked with indium tin oxide (ITO) conductor layers and calcium aluminate oxide spiral resistor layers. The lens can include about 20,000 stacked layers and have a radius of about 2.2 cm and a thickness of about 5 mm. An indium tin oxide central core can extend through the layers. The lens so constructed can have a focal length that varies from infinity when no bias voltage is applied, to 3500 mm in response to a bias of 0.5 V, to about 350 mm in response to a bias of about 5 V.

When the conductor layer 24 is electrically coupled to the second variable voltage source 32 and the bias voltage applied to the conductor layer 24 is kept constant (e.g., 5V), application of a bias voltage (e.g., 5 V) to the conductor layer 24 results in a radial substantially parabolic electric field that decreases from the center to the periphery of the spiral resistor 62. The substantially parabolic electric field is also centered about and extends substantially normal to the optical axis O.

The radial substantially parabolic electric field produces a radial symmetric parabolic index of refraction gradient in the electro-optic layer, which can be varied by variation of the bias voltage applied to the spiral resistor 62 from the first variable voltage source 30. The refractive index distribution produced by applying a bias voltage to the conductor layer 24 provides the electro-optic layer with a diverging lens action and a focal length can be changed readily and continuously by varying the bias voltage from the first variable voltage source 30.

Figure 7:
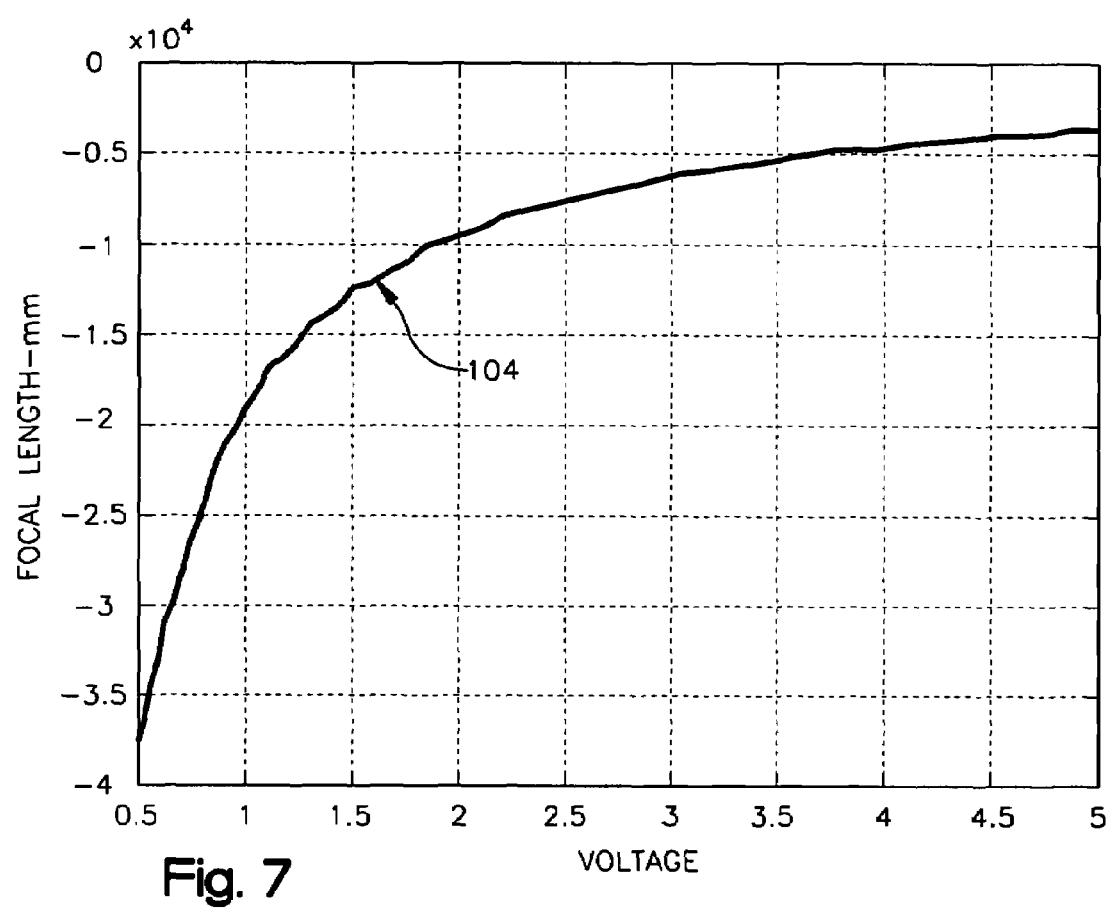
FIG. 7 illustrates a plot of the focal length in mm as a function voltage for a variable focal length lens.

For example, FIG. 7 is a plot 104 that illustrates the focal length in mm as a function voltage for a variable focal length lens. The variable focal length lens in this example, like the variable focal length lens in the preceding example, can include a plurality of barium titanate electro-optic layers alternatively stacked with indium tin oxide (ITO) conductor layers and calcium aluminate oxide spiral resistor layers. The lens can include about 20,000 stacked layers and have a radius of about 2.2 cm and a thickness of about 5 mm. An indium tin oxide central core can extend through the layers. The lens so constructed can have a focal length that varies from about −3750 mm when a bias of about 0.5V is applied to the spiral resistor and a constant bias of about 5V is applied to the conductor layer to a focal length of about −400 mm when a bias of about 5V is applied to the spiral resistor and a constant bias of about 5V is applied to the conductor layer.

It will be appreciated that although the resistor layer 22 in accordance with these examples uses a spiral resistor 62 to generate a substantially parabolic electric field, the parabolic electric field can be generated using resistors having other configurations.

The materials used to form the stacked resistor layers 22, conductor layers 24, and electro-optic layers 20 can be selected so as to minimize reflectance of the variable focal length lens 12. Optically transparent lenses can experience a substantial loss of optical performance due to unwanted reflections from an air-substrate interface. The losses from the air-substrate interface can be minimized by alternating in the optical stack 14 a low refractive index layer with a layer that has a higher refractive index. For example, the conductive layers 24 can be formed from indium tin oxide, which has a refractive index of about 1.6, the electro-optic layers 20 can be formed from barium titanate, which has a refractive index of about 2.4, and the resistor layers 22 can be formed from calcium aluminate oxide, which has a refractive index of about 1.6. These layer when provided in an optical stack 14 where the electro-optic layers 20 are sandwiched between the conductive layers 24 and resistor layers 22 lower the reflectance of the variable focal length lens while providing concomitant improvements in viewing efficiency. As the number of layers in the optical stack 12 increase, the efficiency of reducing the reflectance improves substantially.

Figure 8:
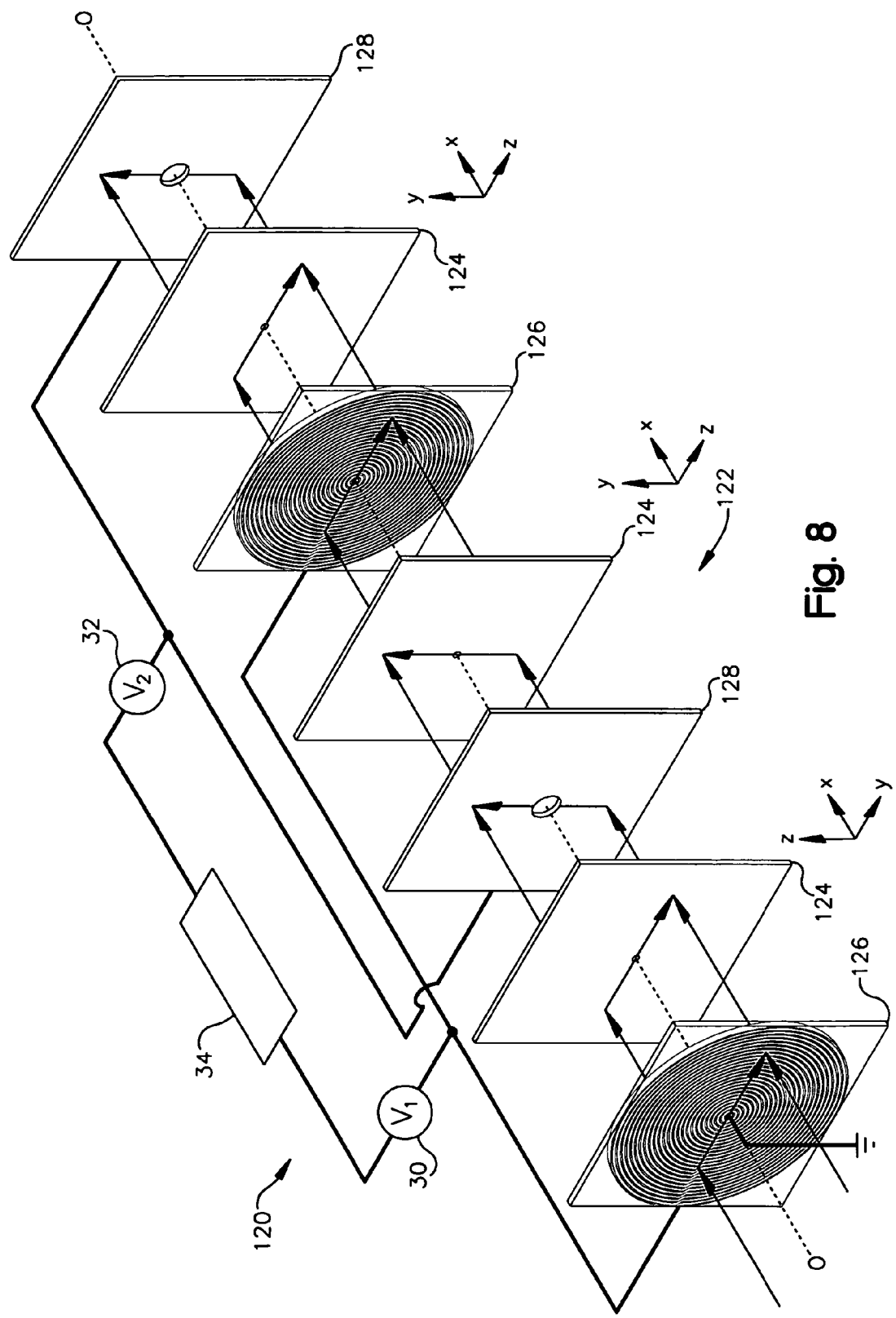
FIG. 8 illustrates a schematic perspective of another embodiment of a variable focal length lens.

Optionally, where an electro-optic material that is capable of rotating the plane of polarization of incident light is used to form the electro-optic layers, the variable focal length can be formed so that it is polarity independent. FIG. 8 illustrates an exploded view of a portion of a variable focal length lens 120 in accordance with another example that it is polarity independent. The variable focal length lens 120 in this example like the variable focal lens 12 in the previous example includes an optical stack 122 that comprises a plurality of substantially transparent electro-optic layers 124, substantially transparent resistor layers 126, and substantially transparent conductor layers 128. The electro-optic layers 120, resistor layers 124, and conductor layers 128 of the optical stack 122 are each substantially planar and extend substantially normal an optical axis O. The electro-optic layers 124 are alternated in the optical stack 120 with the resistor layers 126 and the conductor layer 128 so that each layer of electro-optic layer 124 is substantially parallel to and sandwiched between a separate resistor layer 126 and a separate conductor layer 128.

The electro-optic layers 124 are formed of a substantially transparent electro-optic material that is capable of rotating the plane of polarization of incident light. Examples of such electro-optic materials are barium titanate and KDP. It will be appreciated that other electro-optic materials that rotate the plane of polarization of incident light can also be used.

The electro-optic layers 124 can have an axis of rotary inversion (referred to as the z-axis) and two rotation axes (referred to as x-axis and y-axis). The orientation of electro-optic layers 124 with respect to each other can be such that the x-axis of each electro-optic layer 124 is coincident with the optical axis and the z-axis and y-axis of each subsequent electro-optic layers is oriented 90° to the previous electro-optic layer 124 in the optical stack 122. Incident light passing through the first electro-optic layer 124 is rotated 90 degrees relative to the polarization direction of the first electro-optic layer 124. Light passing through the subsequent electro-optic layers 124 is rotated 90 degrees relative to the polarization direction of each respective electro-optic layer 124. By alternating the axis of rotary of inversion of the electro-optic layers 124 at 90° to each other, the polarization dependence of one of electro-optic layers is undone (compensated) by that of the other so that a variable focal length lens 120 can be formed that is polarity independent. It will be appreciated that a polarity independent lens can also be formed by using an electro-optic material that is not substantially bi-refringent.

Figure 9:
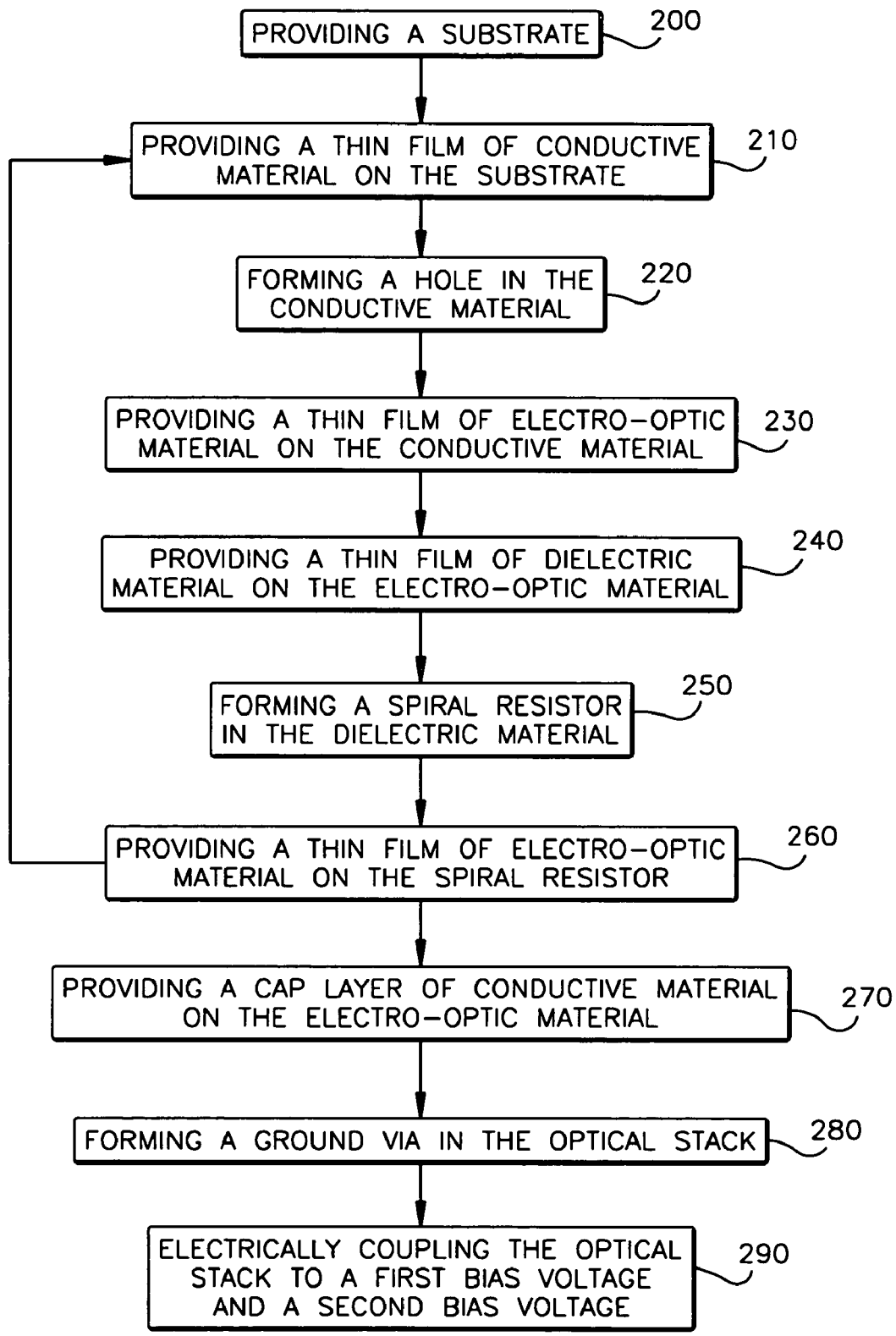
FIG. 9 illustrates a schematic block diagram of a method of forming a portion of the variable focal length lens.

FIG. 9 is a schematic block diagram illustrating an exemplary method of forming a portion of a variable focal length lens similar to the variable focal length lens of FIGS. 1-4. The method uses a Langmuir-Blodgett thin film deposition technique to form the optical stack of the variable focal length lens. In the method, at 200, a solid substrate, such as a glass or crystalline substrate, is provided. The substrate can have a substantially planar first surface and an opposite substantially planar second surface. The first surface and the second surface can each have an area greater than the area of the variable focal lens to be formed.

At 210, thin films of the substantially transparent conductive material are provided on the first surface and the second surface of the substrate. The thin films of the substantially transparent conductive material can be provided on the surfaces of substrate by dipping the substrate vertically into a tank containing a coating solution comprising a monolayer film of the substantially transparent conductive material formed on the surface of a solvent and drawing the substrate from the tank at a constant rate. The substantially transparent conductive material can be, for example, indium tin oxide and the solvent can comprise, for example, a strong acid (e.g., nitric acid) and an organic solvent, such as ethanol, methanol, or acetone. It will be appreciated that other substantially transparent conductive materials can also be used. The thin films of substantially transparent conductive material provided on the first surface and second surface of the substrate can then be dried by heating the films in a drying oven. Optionally, the dried films can be calcined in an inert atmosphere to improve the adhesion of the thin films. The thickness of the substantially transparent conductive films can vary (e.g., about 50 nm to about 500 nm) depending on the residual solid content of the coating solution, the drawing up rate, and the like.

Following drying (and optionally calcination) of the thin films of substantially transparent conductive material, at 220, an opening (or hole) is formed in each thin film of conductive material. The holes extend substantially normal to the film from a first surface of each film to an opposite surface of the film and are aligned with a center portion of each film that is coincident with an optical axis of the lens. The holes can be substantially cylindrical and have diameters of about 100 nm to about 1000 nm. The holes can be formed by, for example, laser drilling or etching (e.g., anistropically etched with etchant gas(es), such as carbon tetrafluoride ($CF_4$) containing fluorine ions or trifluoromethane ($CHF_3$) and argon).

Following formation of the holes in the thin films of substantially transparent conductive material, at 230, thin films of the substantially transparent electro-optic material are provided on the thin films of conductive material. The thin films of electro-optic material fill the holes provided in the thin films of conductive material and define a substantially planar surface of electro-optic material over each thin film of conductive material.

The thin films of electro-optic material can be provided on the thin films of conductive material by dipping the substrate vertically into a tank containing a coating solution comprising a monolayer film of the electro-optic material formed on the surface of a solvent and drawing the substrate from the tank at a constant rate. The electro-optic material can be, for example, barium titanate and the solvent can comprise a strong acid and an organic solvent. It will be appreciated that other electro-optic materials can also be used. The thin films of electro-optic (e.g., ITO) can be dried by heating the films in a drying oven and optionally calcined in an inert atmosphere to improve the adhesion of the thin film.

Following drying, at 240, thin films of substantially transparent dielectric material, such as calcium aluminate oxide, are provided on the thin films of electro-optic material. The thin films of dielectric material can be provided on the surfaces of substrate by dipping the substrate vertically into a tank containing a coating solution comprising a monolayer film of dielectric material formed on the surface of a solvent and drawing the substrate from the tank at a constant rate. The thin films of dielectric can be dried by heating the films in a drying oven.

At 250, spiral resistors can be formed in the dried dielectric thin films. The spiral resistors can be formed in the dried dielectric thin films by doping the dielectric thin film with hydrogen ions and inscribing the thin films of doped dielectric with UV light in a spiral configuration. The dielectric film can be doped with hydrogen ion by heating the thin films of dielectric material in a hydrogen atmosphere at an elevated temperature. The UV light can be provided in a spiral by providing a mask over each dielectric thin films that has opening defining the shape of the spiral resistor and irradiating the exposed spiral portions of the dielectric layers with UV light.

At 260, following formation of the spiral resistors in the dielectric thin films, thin films of the substantially transparent electro-optic material are provided over the spiral resistors. The thin films of electro-optic material can be provided on the surfaces of substrate by dipping the substrate vertically into a tank containing a coating solution comprising a monolayer film of the electro-optic material formed on the surface of a solvent and drawing the substrate from the tank at a constant rate. The thin films of electro-optic (e.g., ITO) can then be dried by heating the films in a drying oven and optionally calcined in an inert atmosphere to improve the adhesion of the thin film.

The steps of 210 to 260 can be repeated, for example, about 10,000 to about 20,000 times until optical stacks comprising about 10,000 to about 20,000 layers are formed on each surface of the substrate.

At 270 cap layers (i.e., final thin films of conductive material with a central hole filled with electro-optic material) can be provided over the thin films of electro-optic material to complete the optical stacks. The optical stacks can each have a thickness of, for example, about 5 mm to about 10 mm.

Following formation of the optical stacks, at 280, a ground via can be provided in each of the optical stacks. The ground via can be formed in each optical stack by laser drilling a hole in each optical stack that extends substantially normal to the layers of the stack and that is coincident with the holes provided in the thin films of conductive material. The holes laser drilled through the optical stack have a diameter that is less than the diameter of the holes formed in the thin films of conductive material. The holes in optical stack can then be filled with substantially transparent conductive material, such as the conductive material used to form the conductive thin film layers, using, for example, thin film deposition techniques. The ground via so formed contacts the spiral resistor but is electrically isolated form the thin films of conductive material.

At 280, the optical stacks can be removed from the substrate, machined to desired configuration, and electrically coupled to a bias voltage (e.g., first bias voltage and a second bias voltage).

Those skilled in the art will understand and appreciate that variations in the variable focal length lens and the methods of forming portions of the variable focal length lens can be utilized. For example, it is to be appreciated that variable focal length lens can be formed using other film deposition techniques, such as spin-on-dielectric (SOD) and chemical vapor deposition (CVD).

What has been described above includes illustrated examples depicting how the present invention might be implemented. Further combinations and permutations of the present invention are possible. Accordingly, the present invention is intended to embrace all such alterations, modifications and variations that fall within the spirit and scope of the appended claims.

The invention claimed is:

1. A variable focal length lens comprising:
   a plurality of layers of an electro-optic material; and
   alternating stacked transparent conductor layers and transparent resistor layers; each layer of electro-optic material being sandwiched between a separate conductor layer and a separate resistor layer, the focal length of the lens varying with voltage applied to the resistor layers, wherein
   the resistor layers and conductor layers upon application of a bias voltage being capable of applying to the layers of electro-optic material a substantially parabolic electric field having a intensity distribution that varies in a plane normal to the direction of light incidence, and wherein
   the resistor layers each comprising a substantially transparent layer of dielectric material and a substantially transparent spiral resistor, the spiral resistor generating the substantially parabolic electric field upon application of the bias voltage.

2. The variable focal length lens of claim 1, the dielectric material and spiral resistor comprising the same material.

3. The variable focal length lens of claim 2, the dielectric material comprising doped calcium aluminate oxide.

4. The variable focal length lens of claim 1, the electro-optic material comprising at least one of a Pockels effect material and a Kerr effect material.

5. The variable focal length lens of claim 1, the electro-optic material comprising a solid state material selected from group consisting barium titanate ($BaTiO_3$), lanthanum-modified lead zirconate titanate (PLZT), lithium niobate ($LiNbO_3$), lithium titanate ($LiTaO_3$), dibasic potassium phosphate ($KH_2PO4$) (KDP), zinc oxide (ZnO), and combinations thereof.

6. The variable focal length lens of claim 1, being substantially polarity independent.

7. The variable focal length lens of claim 1, the conductor layers and the resistor layers each being formed from materials having a refractive index lower than the refractive index of the electro-optic material.

8. The variable focal length lens of claim 1, the layers of electro-optic material each having a substantially uniform thickness, the thickness of each layer being about 50 nm to about 500 nm.

9. A variable focal length lens comprising:
a plurality of layers of an electro-optic material; and
alternating stacked substantially transparent conductor layers and substantially transparent resistor layers; each layer of electro-optic material being sandwiched between a separate substantially transparent conductor layer and a separate substantially transparent resistor layer;
the resistor layers and conductor layers upon application of a bias voltage being capable of applying to the layers of electro-optic material a substantially parabolic electric field having a intensity distribution that varies in a plane normal to the direction of light incidence;
the focal length of the lens varying with voltage applied to the resistor layers, wherein
the resistor layers each comprising a substantially transparent layer of dielectric material and a substantially transparent spiral resistor, the spiral resistor generating the substantially parabolic electric field upon application of the bias voltage.

10. The variable focal length lens of claim 9, the dielectric material and spiral resistor comprising the same material.

11. The variable focal length lens of claim 10, the dielectric material comprising doped calcium aluminate oxide.

12. The variable focal length lens of claim 9, the electro-optic material comprising at least one of a Pockels effect material and a Kerr effect material.

13. The variable focal length lens of claim 9, being substantially polarity independent.

14. The variable focal length lens of claim 9, the conductor layers and the resistor layers each being formed from materials having a refractive index lower than the refractive index of the electro-optic material.

15. A method of forming a variable focal length lens, the method comprising; that
providing a substrate;
providing a film of substantially transparent conductive material on substrate;
providing a film of electro-optic material on the film of conductive material;
providing a film of substantially transparent dielectric material on the film of electro-optic material; and
forming a resistor in the dielectric material that upon application of a bias voltage is capable of applying to the electro-optic material a substantially parabolic electric field having an intensity distribution that varies in a plane normal to the direction of light incidence.

16. The method of claim 15, the resistor having a spiral shape that extends across the film of dielectric material.

17. The method of claim 15, the resistor being formed by steps comprising,
doping the dielectric material and
inscribing the doped dielectric material with ultra-violet light.

18. The method of claim 15, the dielectric material being doped with hydrogen.

19. The method of claim 17, the inscribed portion of the dielectric material being in shape of a spiral.

20. The method of claim 15, further comprising:
providing a film of electro-optic material on the resistor; and
repeating all of the steps of claim 18 until an optic stack is formed that comprises at least about 1000 layers.

21. The method of claim 15, providing a ground via in the optic stack, the ground via comprising a substantially transparent conductive material and extending through each of the layers of the optic stack substantially coincident with an optic axis of the lens.

22. The method of claim 21, the films of substantially transparent conductive material, electro-optic material, and substantially transparent dielectric material being provided using a Langmuir-Blodgett thin film deposition process.

* * * * *